United States Patent [19]

Grogl et al.

[11] Patent Number: 4,647,151
[45] Date of Patent: Mar. 3, 1987

[54] OPTICAL COMMUNICATION CABLE

[75] Inventors: Ferdinand Grogl, Oberstenfeld; Hans-Jörg Widler, Stuttgart, both of Fed. Rep. of Germany

[73] Assignee: International Standard Electric Corporation, New York, N.Y.

[21] Appl. No.: 664,809

[22] Filed: Oct. 25, 1984

[30] Foreign Application Priority Data

Oct. 29, 1983 [DE] Fed. Rep. of Germany ....... 3339389

[51] Int. Cl.⁴ ............................................. G02B 6/44
[52] U.S. Cl. .................................................. 350/96.23
[58] Field of Search ............... 350/96.23, 96.20, 96.21, 350/96.22

[56] References Cited

U.S. PATENT DOCUMENTS 4,416,508  11/1983  Dey et al. ........................ 350/96.23

FOREIGN PATENT DOCUMENTS 2902259  7/1980  Fed. Rep. of Germany ... 350/96.23

*Primary Examiner*—John Lee
*Attorney, Agent, or Firm*—John T. O'Halloran; Mary C. Werner

[57] ABSTRACT

The cable core containing one or more optical waveguides is protected from longitudinal and transverse forces by being loosely disposed within a sheathing. The sheathing consists of a tubing which is divided into two sections in the longitudinal direction. Following the placement of the cable core in one tubing section, the latter is closed by placing the other tubing section thereon, in such a way that the two tubing sections are thereafter inseparably connected to one another.

2 Claims, 2 Drawing Figures

OPTICAL COMMUNICATION CABLE

BACKGROUND OF THE INVENTION

The invention relates to an optical communication cable and more particularly to an optical communication cable in which a cable core is disposed within a non-metallic sheathing.

In one such non-metallic optical fiber cable, the cable core including the optical waveguides are as much protected as possible from longitudinal and transverse (shearing) forces of the type which are likely to occur, for example, in the case of aerial or overhead cables, by arranging the cable core loosely within the sheathing.

Up to now, the glass fiber reinforced sheathing has been manufactured in accordance with a special type of impregnation method. In the course of this, it is difficult to achieve a clearance between the sheathing and the core. Moreover, the cable core, during the curing of the sheathing, is subjected to a high thermal load. Therefore, it is necessary to provide for an additional heat insulation of the cable core.

It is the object of the invention to provide a cable of the aforementioned type including a cable core disposed within a sheathing without causing any problems.

SUMMARY OF THE INVENTION

This object is achieved by the the present invention which provide an optical communication cable including a cable core with at least one optical waveguide therein, a sheathing of a tubular glass fiber reinforced cured plastic material surrounding and spaced radially outwardly from the outside of the cable core to form a space therebetween. The sheathing includes first and second longitudinally-extending sections with opposed longitudinally extending sides, the sides having an inner edge facing the space and an opposed outer edge. A first strip extends in a circumferential direction longitudinally along the outer edge of each of the sides of said first section to form an opening in the first section and a second strip extends in a circumferential direction longitudinally along the inner edge of each of the sides of the second section, each of the second strips being positioned in the respective openings in the first sections so as to provide a locking connection with the first sections. A layer of a protective sheathing material is positioned on the tubular sheathing.

The advantages which are achieved by the invention reside in a simple placement of the cable core into the tubing section which is open in the upward direction, and following closing of the tubing section with the aid of the second tubing section, in a jacketing of the cable core without requiring any heating, to effect the safeguarding of the core, subsequent to the jacketing, which is loosely positioned inside the tubing.

BRIEF DESCRIPTION OF THE DRAWING

The invention will now be explained in greater detail with reference to a preferred embodiment shown in FIGS. 1 and 2 of the accompanying drawings, in which:

FIG. 1 shows a cross section of one embodiment of the basic construction of an optical cable 1 on an enlarged scale.

DESCRIPTION OF THE PREFERRED EMBODIMENT

Figure 1:
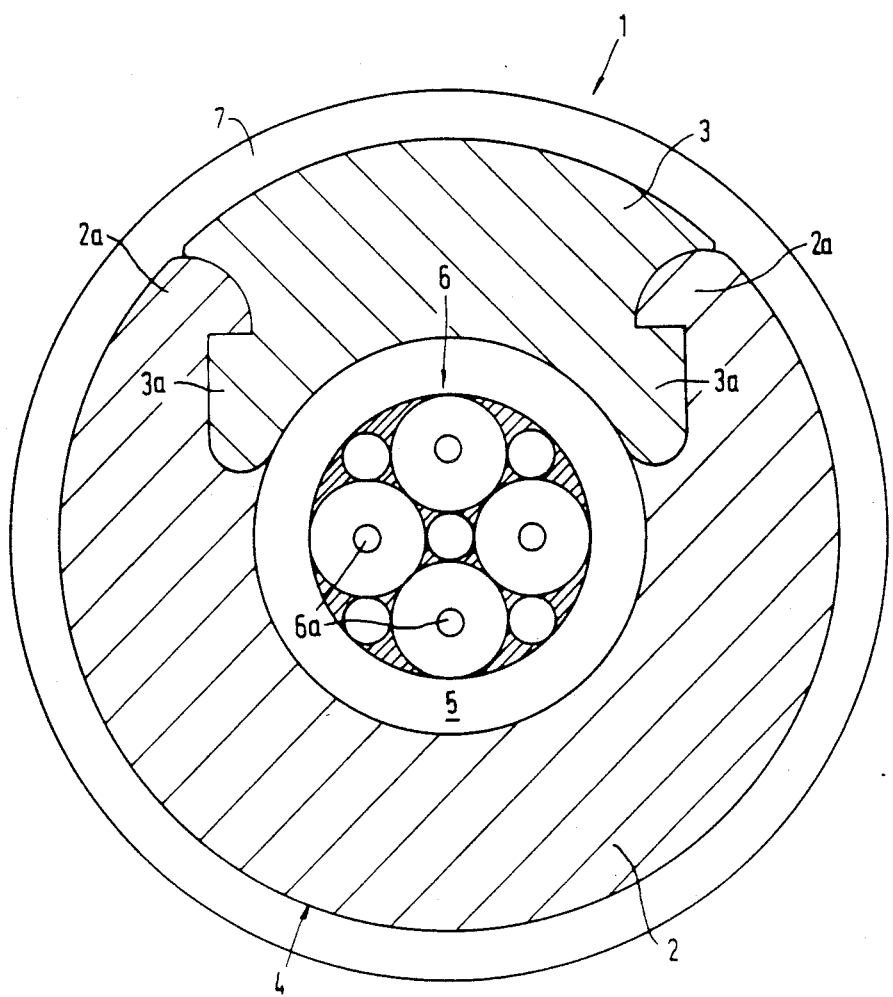
FIG. 1 shows the cross section of a cable, on a considerably enlarged scale, comprising a sheathing tubing according to the invention.

The sheathing for a cable core 6 containing, for example, four optical waveguides 6a, consists of a sheathing tubing 4 which is divided into two sections in the longitudinal direction, and has a centrally disposed interior space 5 for receiving the cable core 6. The one tubing section 2 is open toward the outside in the longitudinal direction having a width of the diameter of the interior space 5. The other tubing section 3 is so designed as to fit exactly into the longitudinal opening in the section 2. The inner side of the tubing section 3 is substantially equal to the radius of the interior space 5. For the locking in position of the inserted tubing section 3, the two sections 2 and 3, as shown in FIG. 1, are provided with snap-in strips 2a and 3a extending in the longitudinal direction. These snap-in strips are so designed that the tubing section 3, when joined, snaps into the tubing section 2, that is in such a way that the two tubing sections are thereafter inseparably connected to one another.

Whenever the connection between the tubing sections 2 and 3 is required to have an increased mechanical strength, the two sections 2 and 3 can be additionally bonded to each other within the area of engagement. A protective sheathing 7, subsequently applied to the tubing 4, takes care of providing a firm and durable connection between the two tubing sections 2 and 3.

The two tubing sections 2 and 3 are made from a glass fiber reinforced plastics material by means of an extrusion process. Wound in great lengths on delivery drums, they are available for further processing.

Figure 2:
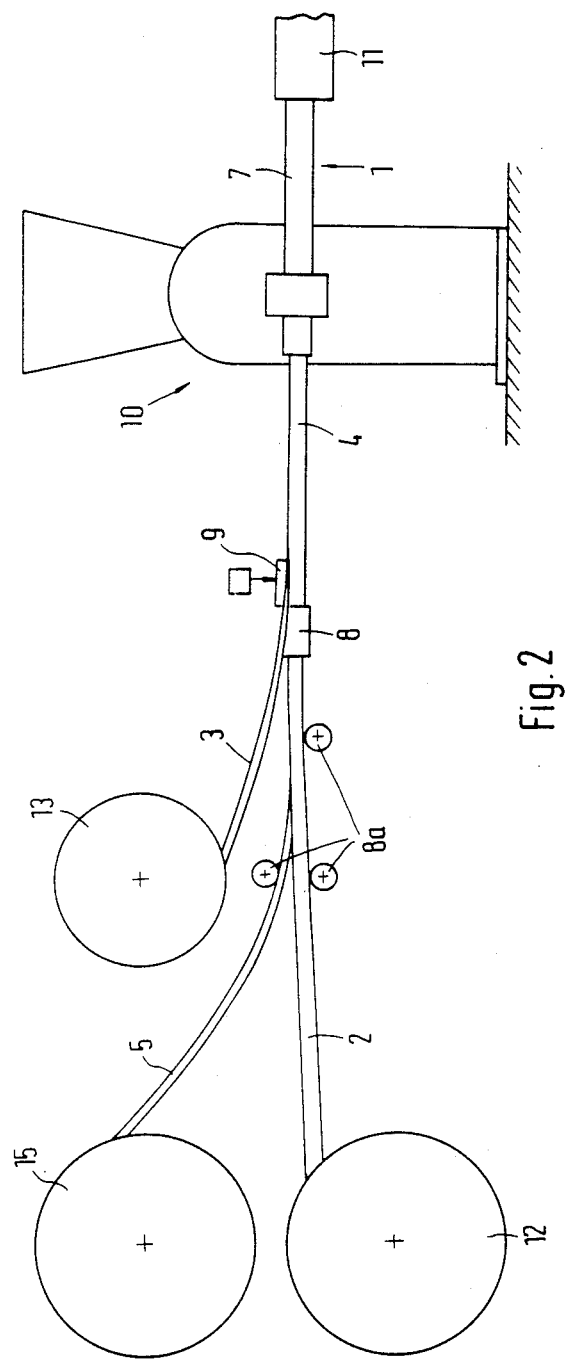
FIG. 2 shows a device for inserting a cable core into a sheathing tubing as shown in FIG. 1, and the subsequent extrusion of a protective sheathing in a schematic representation.

The device required for processing the tubing sections 2 and 3 and for completing the cable 1, is shown in FIG. 2 in a schematic representation. It consists of holding arrangements (not shown) for the delivery drums 12, 13 and 15 on which the tubing sections 2, 3 and the cable core 5 are wound, as well as of a guiding station 8 with guide rollers 8a, a compression device 9, an extruder 10 and of a subsequently arranged cooling device 11.

The tubing section 2 is led from the delivery drum 12, via the guide rollers 8a, to the guiding station 8. Within the range of this supply length, the cable core 5 as pulled off the delivery drum 15, is placed into the tubing section 2 which is open in the upward direction. Within the area of the guiding station 8, there is supplied the tubing section 3 as pulled off the delivery drum 13. Depending on the given conditions and the requirements placed on the cable itself, either a spreading device and/or an applicator (dispenser) for an adhesive may be included in the guiding station 8. By the compression device 9, the tubing section 3, following any possible preceding spreading of the opposite member, is pressed into the opening of the tubing section 2 with which it comes into a form-fitting, non-detachable engagement in the manner described hereinbefore. The thus closed sheathing 4 thereafter passes through an extruder 10 in which the tubing 4 is provided with a protective sheathing 7 of plastics material which is resistant to environmental influences. While passing through the cooling device 11, the protective sheathing 7 is cooled down. The finished cable 1 is then wound onto a cable drum.

There is no requirement for the tubing sheathing 4 to have a circular cross section. There may be cases of practical application in which an oval or a square cross section is advantageous.

We claim:

1. An optical communication cable comprising:
   a cable core having at least one optical waveguide therein;
   a sheathing of a tubular glass fiber reinforced cured plastic material surrounding and spaced radially outwardly from the outside of said cable core to form a space therebetween, said sheathing including first and second longitudinally-extending sections, each of said sections having two opposed longitudinally extending sides, and each of said sides having an inner edge facing the space and an opposed outer edge, and a first strip extending in a circumferential direction longitudinally along the outer edge of each of said sides of said first section to form an opening in said first section and a second strip extending in a circumferential direction longitudinally along the inner edge of each of said sides of said second section, each of said second strips being positioned in the respective openings in said first sections so as to provide a locking connection with said first sections; and
   a layer of a protective material disposed on the outer surface of said sheathing.

2. The cable of claim 1 wherein said first section is bonded to said second section.

* * * * *